United States Patent [19]

Golan

[11] 3,927,579

[45] Dec. 23, 1975

[54] DOWN SHIFT INHIBITOR SYSTEM FOR AUTOMATIC TRANSMISSION CONTROL

[75] Inventor: Kenneth Frank Golan, Pekin, Ill.

[73] Assignee: Caterpillar Tractor Co., Peoria, Ill.

[22] Filed: Mar. 14, 1974

[21] Appl. No.: 451,012

[52] U.S. Cl. .................. 74/752 C; 74/861; 74/868; 74/869
[51] Int. Cl. ..................... F16h 3/74; B60k 41/18
[58] Field of Search ............ 74/861, 862, 863, 864, 74/865, 866, 867, 869, 752 C

[56] References Cited
UNITED STATES PATENTS

| | | | |
|---|---|---|---|
| 3,313,183 | 4/1967 | Bailey et al. | 74/752 C |
| 3,452,621 | 7/1969 | Golan et al. | 74/752 C |
| 3,578,007 | 5/1971 | Blake | 74/752 C X |
| 3,638,771 | 2/1972 | Chana | 74/869 X |
| 3,656,373 | 4/1972 | Shimosaki | 74/869 |
| 3,691,872 | 9/1972 | Schaefer et al. | 74/869 X |
| 3,709,064 | 1/1973 | Schaefer et al. | 74/867 X |
| 3,738,198 | 6/1973 | Kell | 74/868 |
| 3,754,483 | 8/1973 | Edmunds | 74/868 X |
| 3,789,698 | 2/1974 | Williams | 74/868 X |
| 3,818,783 | 6/1974 | Norris et al. | 74/867 X |

Primary Examiner—Benjamin W. Wyche
Assistant Examiner—Lance W. Chandler
Attorney, Agent, or Firm—Ralph E. Walters

[57] ABSTRACT

An automatic transmission control for the automatic range of a transmission has a power control valve for selecting a desired gear ratio with a manual control valve operable to set the desired gear selection and a plurality of selector valves automatically operated to set the power control valve dependent upon the transmission output speed and up to a highest gear selection selected by an operator. The action of the selector valves is inhibited in down shift of the transmission as demanded by physical movement of the manual control valve to a lower gear setting until a predetermined transmission output speed is reached to avoid overspeeding of the engine.

2 Claims, 15 Drawing Figures

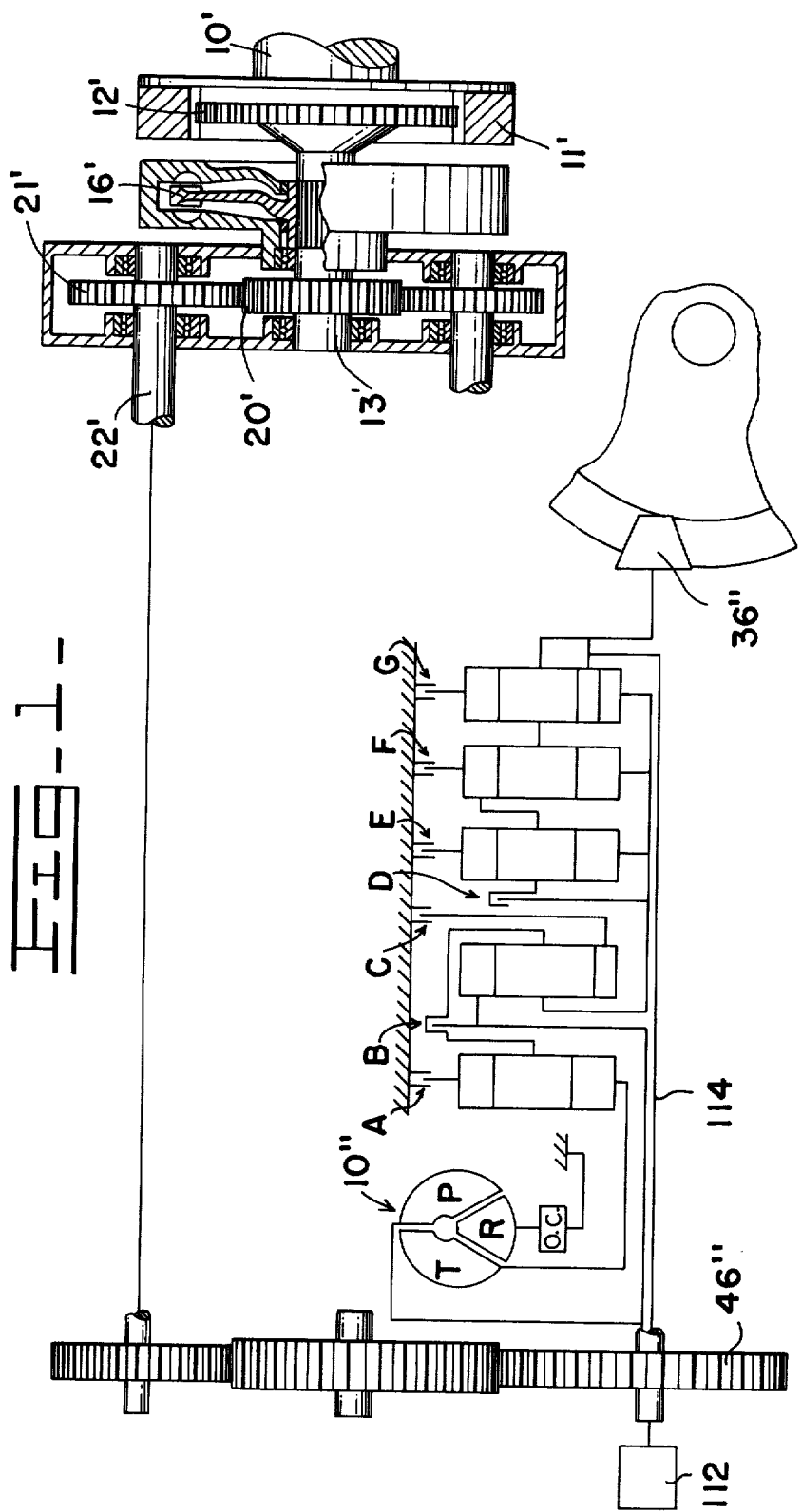

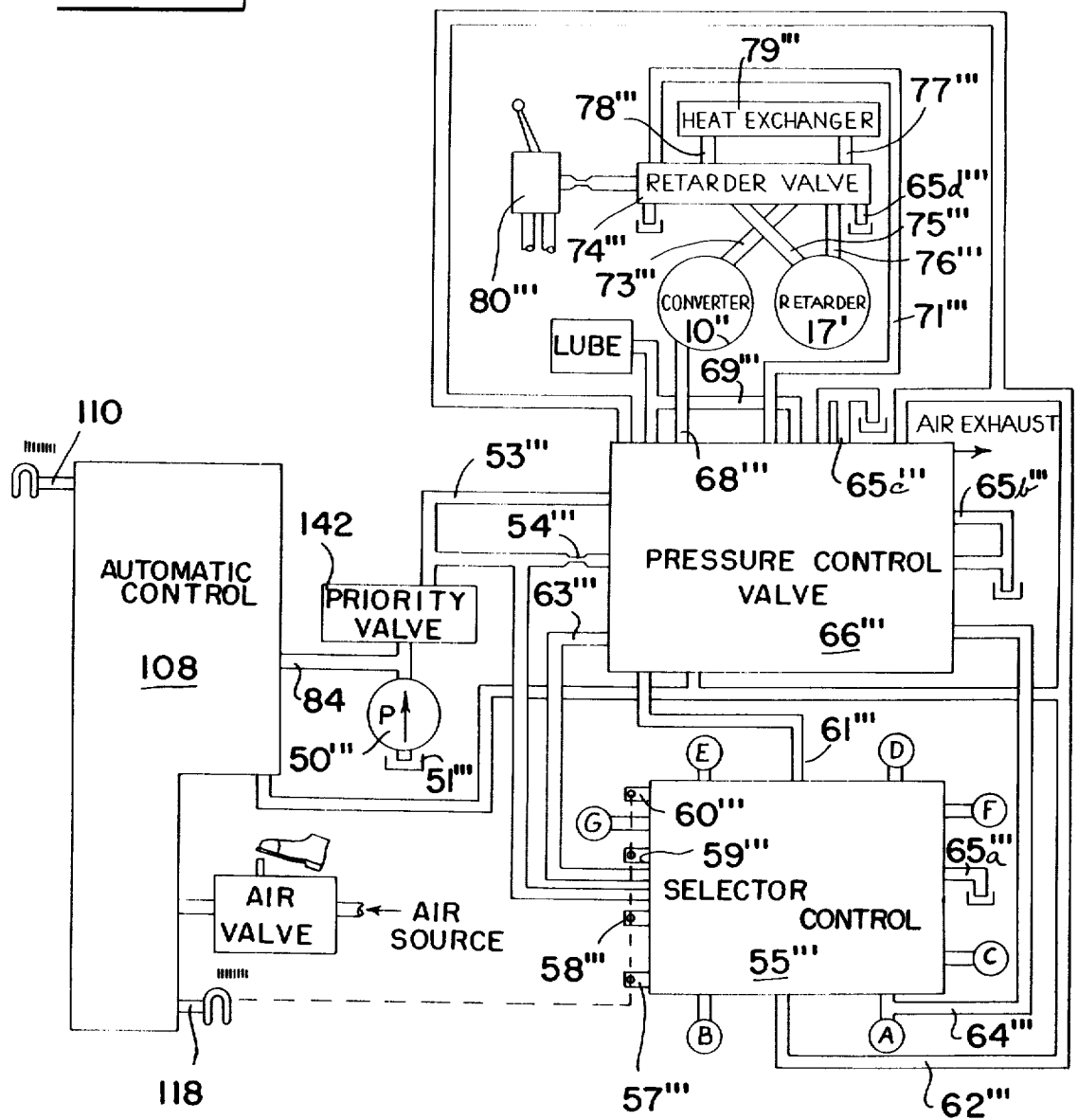
Fig_2_

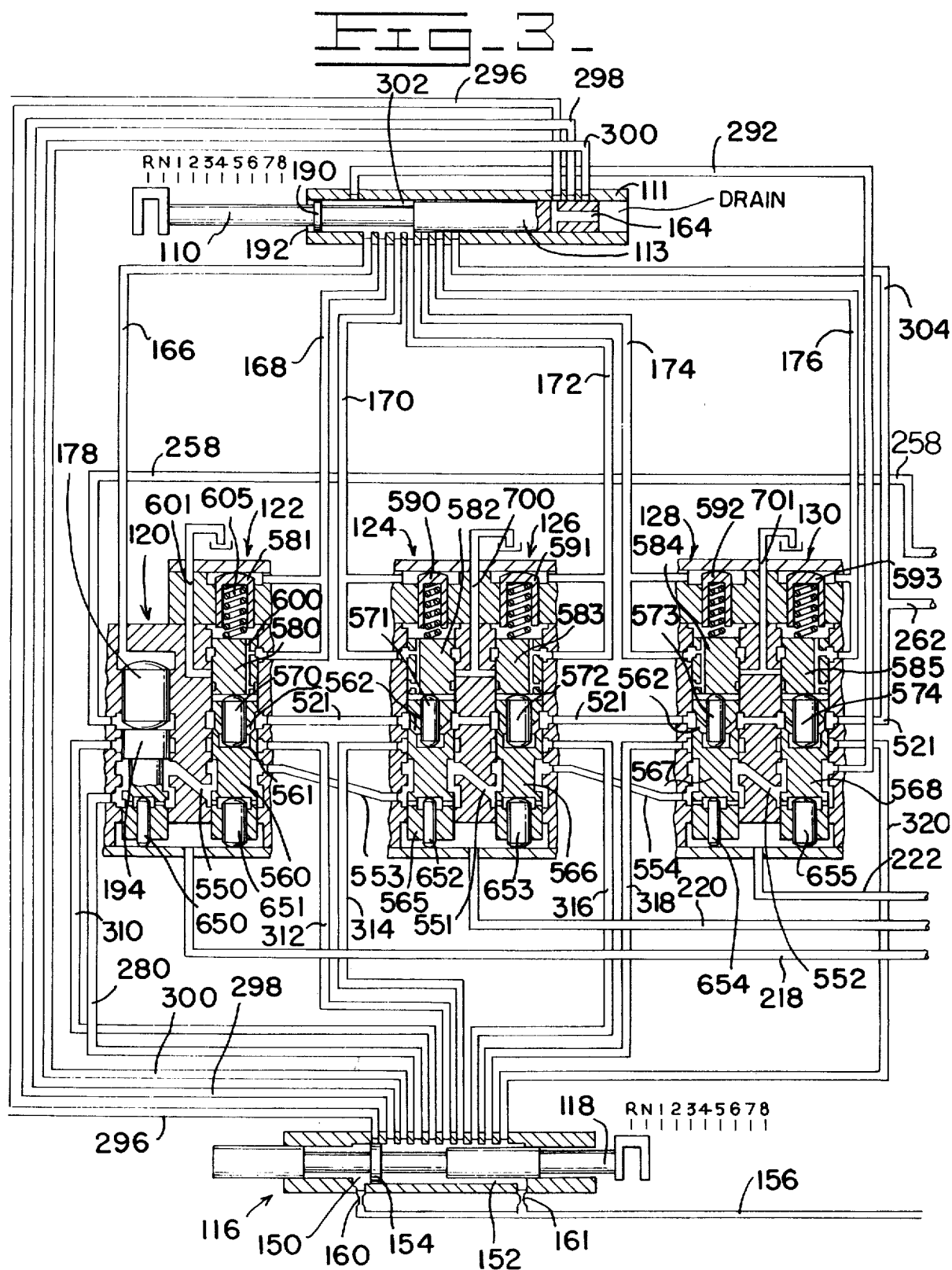

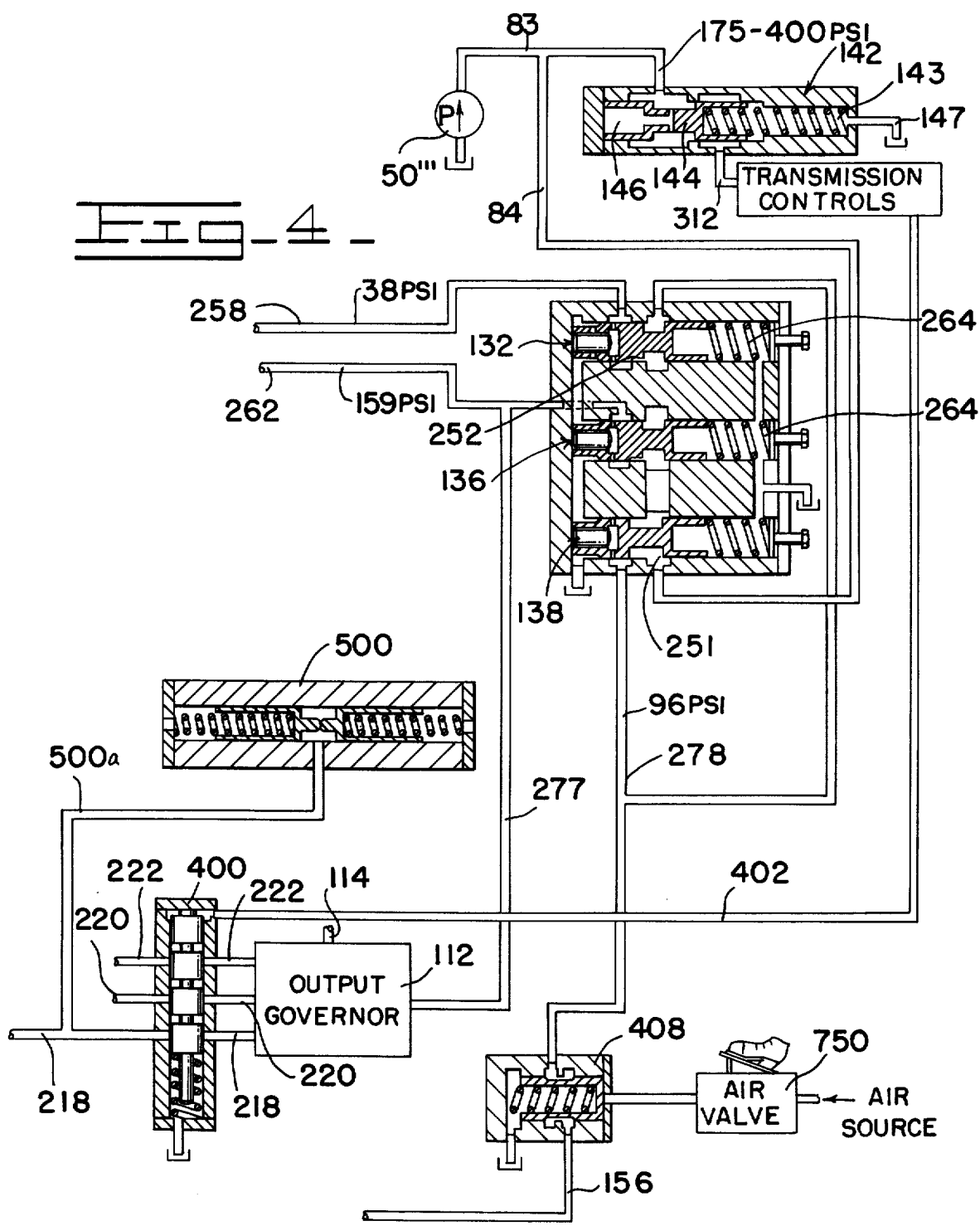
Fig_4

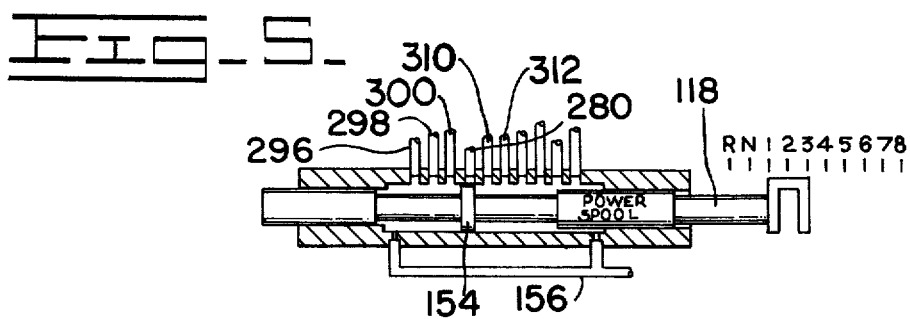
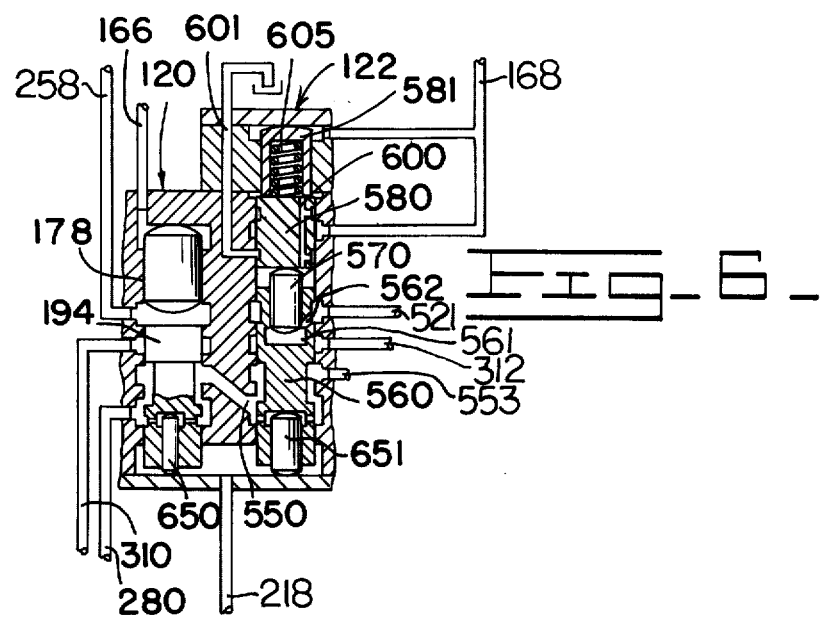
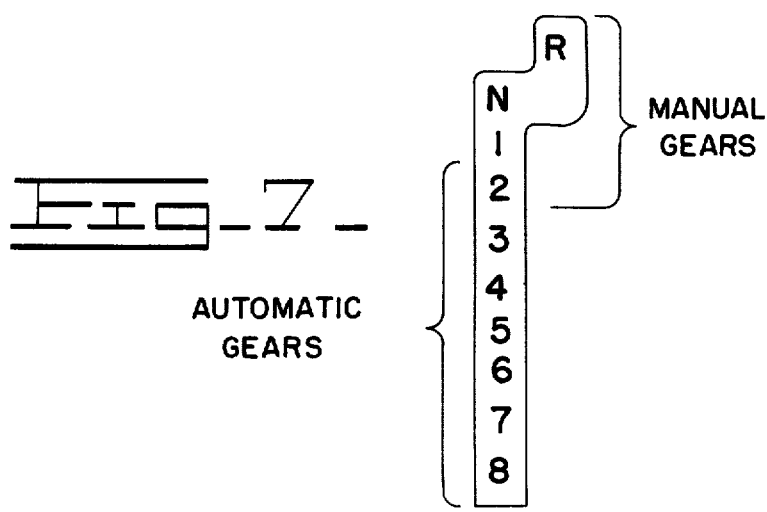

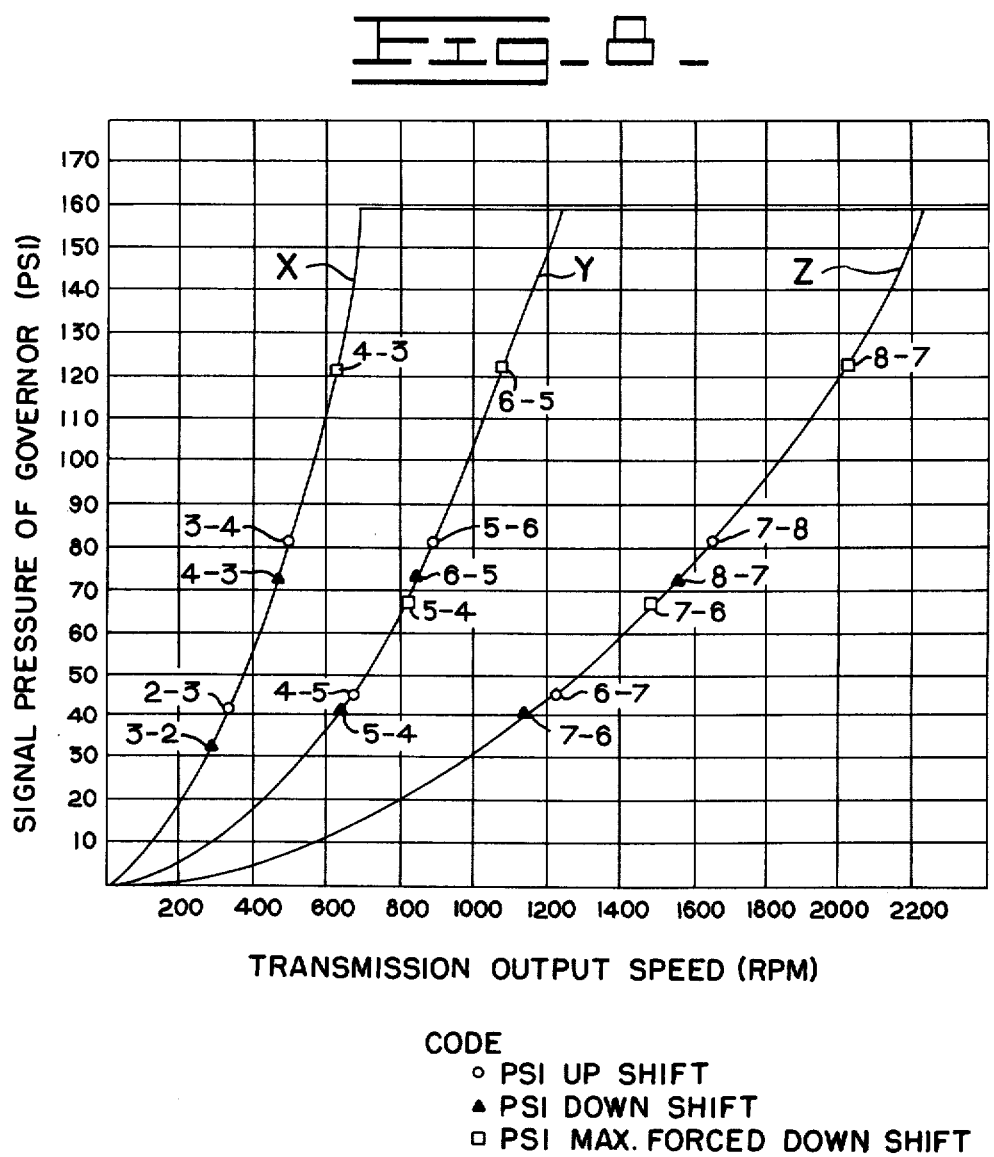

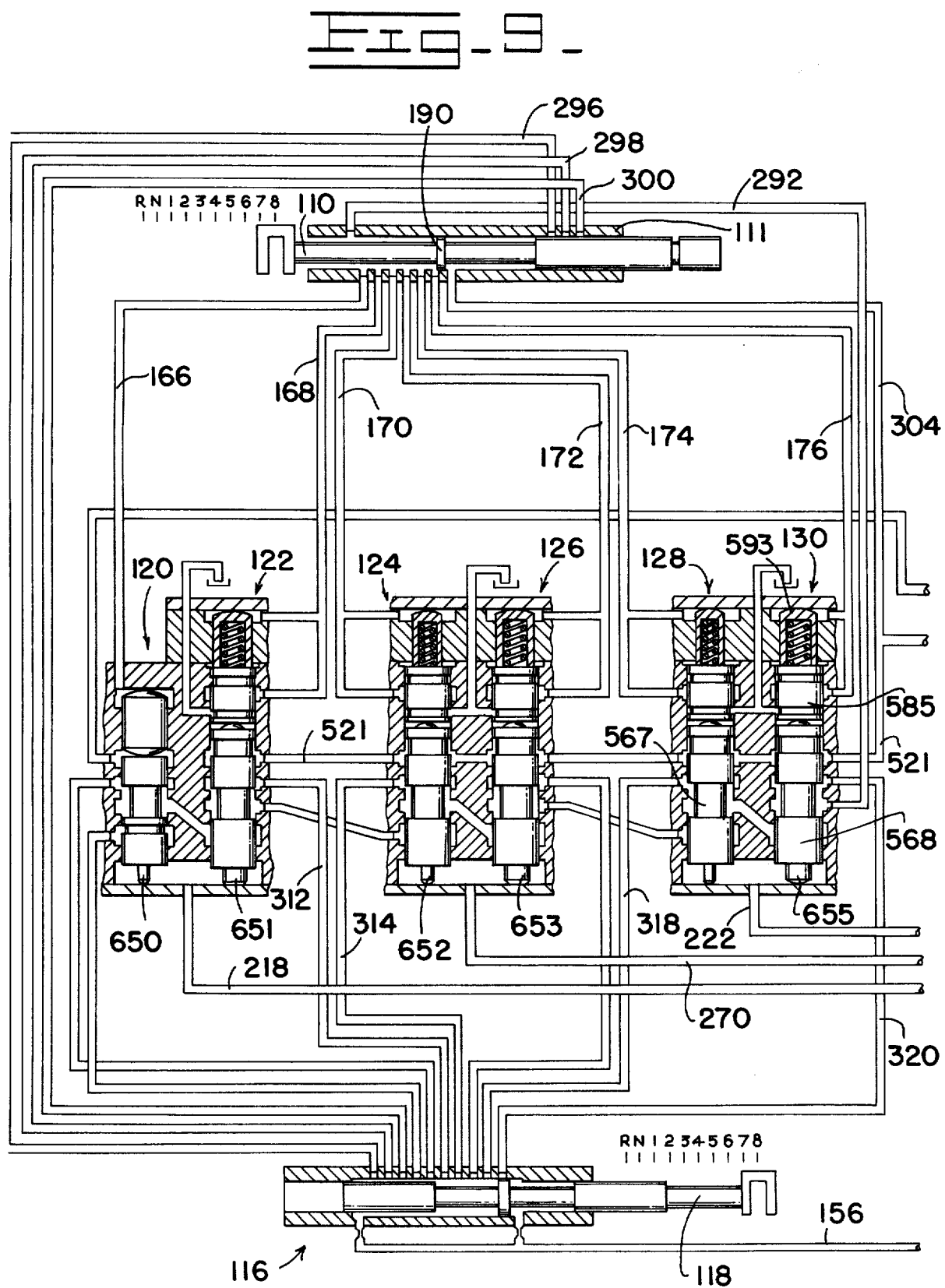

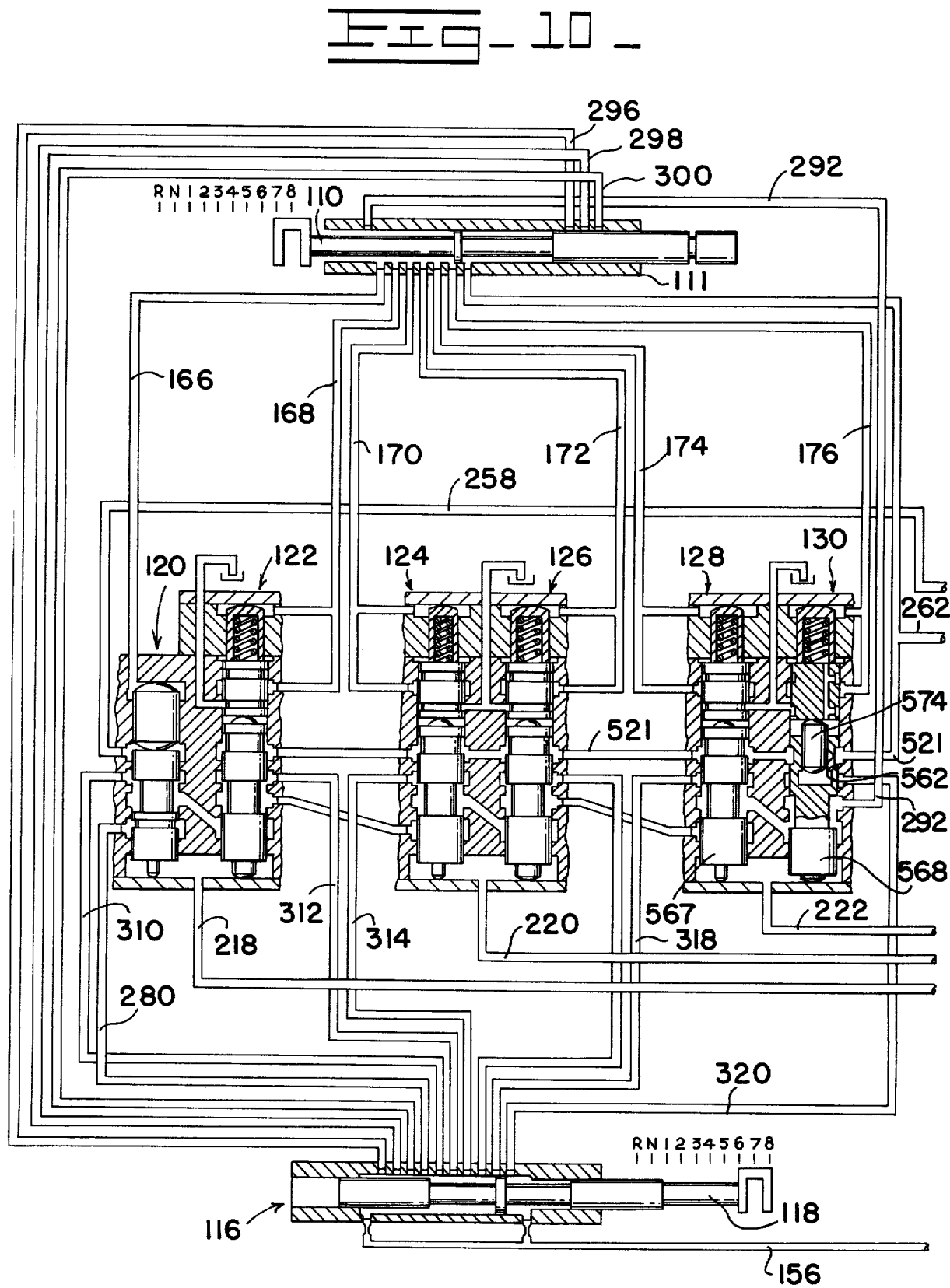

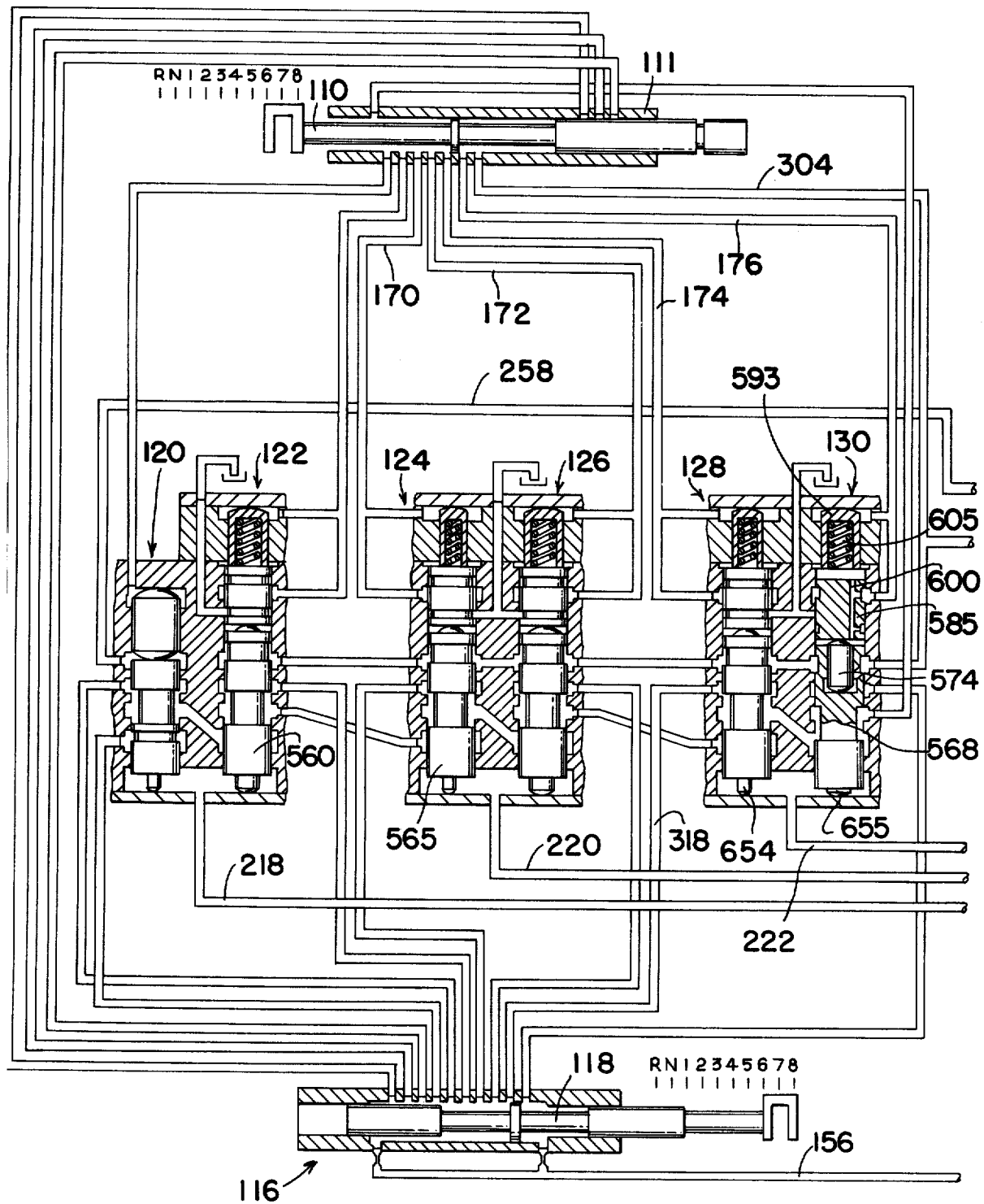

| SHIFT | ENGINE RPM | OUTPUT RPM | APPROX. GOVERNOR SIGNAL PRESSURE-PSI | | | |
|---|---|---|---|---|---|---|
| | | | SPOOL A | SPOOL B | SPOOL C | |
| 2 - 3 | 1955 | 350 | 41 | 12 | 4 | NORMAL SHIFT PTS. |
| 3 - 4 | 2220 | 495 | 81* | 25 | 7 | |
| 4 - 5 | 2220 | 670 | 149 | 45 | 14 | |
| 5 - 6 | 2220 | 899 | 159 | 81* | 24 | |
| 6 - 7 | 2231 | 1222 | 159 | 150 | 45 | |
| 7 - 8 | 2220 | 1641 | 159 | 159 | 81* | |
| 8 - 7 | 1550 | 1550 | 159 | 159 | 72 | |
| 7 - 6 | 1563 | 1155 | 159 | 134 | 40 | |
| 6 - 5 | 1550 | 849 | 159 | 73 | 22 | |
| 5 - 4 | 1563 | 633 | 133 | 40 | 12 | |
| 4 - 3 | 1550 | 468 | 73 | 22 | 7 | |
| 3 - 2 | 1411 | 315 | 33 | 10 | 3 | |
| 8 - 7 | 2010 | 2010 | 159 | 159 | 122 | FORCED DOWN-SHIFT POINTS |
| 7 - 6 | 2014 | 1489 | 159 | 159 | 67 | |
| 6 - 5 | 2009 | 1101 | 159 | 122 | 37 | |
| 5 - 4 | 2015 | 816 | 159 | 67 | 20 | |
| 4 - 3 | 2008 | 606 | 122 | 37 | 11 | |

\* GOVERNOR PRESSURES ARE ADJUSTED AND MATCHED AT THESE POINTS

FIG-12

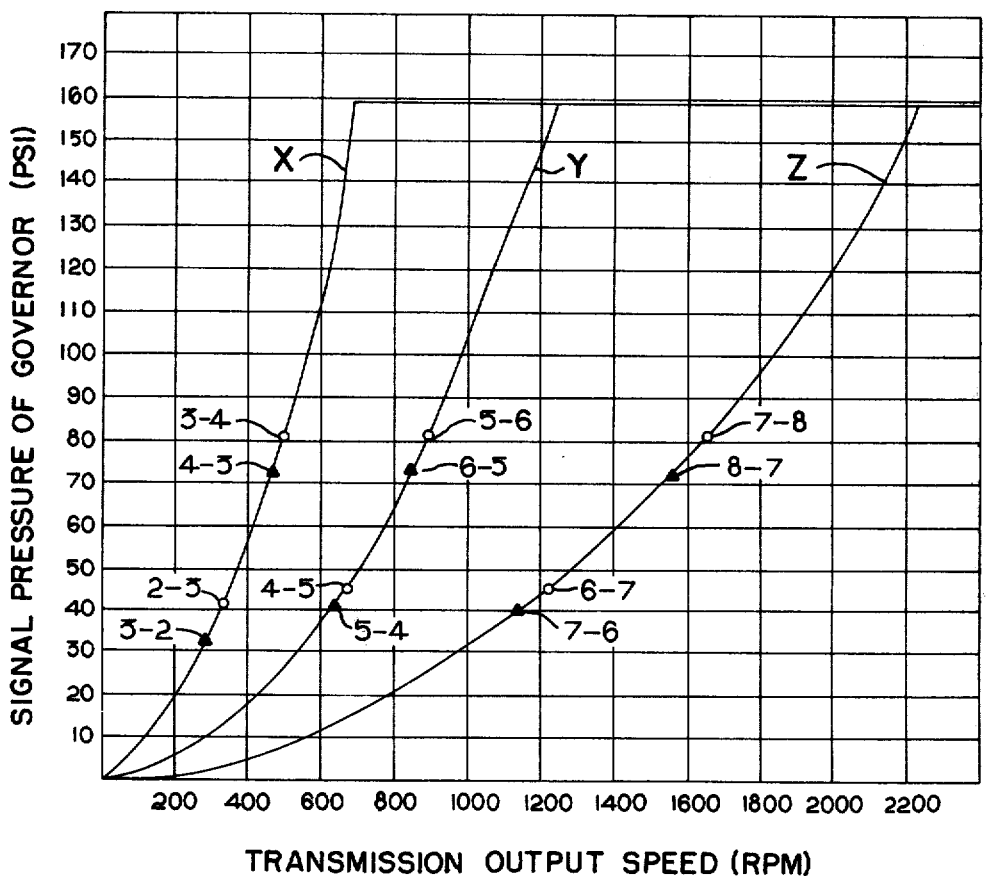

DOWN SHIFT INHIBITOR SYSTEM FOR AUTOMATIC TRANSMISSION CONTROL

BACKGROUND OF THE INVENTION

This invention relates to an all hydraulic automatic transmission control and down shift inhibitor system which provides for automatic shift of the gear ratio of the transmission within a range of operation and permits an operator to set a desired lower gear of operation but inhibits the down shift of the transmission in accordance with the transmission output speed in order to avoid engine overspeed resulting from down shift.

The assignee of this application has an automatic transmission control as disclosed in U.S. Pat. No. 3,452,621 wherein the multi-speed transmission has a manual range of operation and a second group of gear ratios operable in an automatic range of operation. An operator can set a manual control valve at a desired gear in the automatic range and the control disclosed in this patent provides for automatic up shift and down shift up to the gear manually set and down to the highest gear in the manual range of operation. When an operator manually sets the gear selector to a lower gear, it is possible for the control in the patent to provide a resulting downshift of the transmission which could result in overspeeding the engine and resulting damage thereto.

U.S. Pat. Nos. 3,613,480 and 3,682,014 disclose power transmissions and a recognition of the desirability of inhibiting down shift. In each of these patents, the down shift is inhibited by restriction of movement of the manually operable gear selector with the result that an operator cannot set the desired gear by movement of the gear selector until such time as the gear selector is released for movement.

U.S. Pat. No. 3,709,064 discloses a transmission control utilizing solenoid operated valves for shifting the transmission and with governor pressure responsive inhibitor valves operable to block operation of the solenoid operated valves. The control disclosed in this patent does not provide for automatic up shift and down shift in the automatic range of operation with the additional provision for forced down shift by an operator which is inhibited and dependent upon the transmission output speed.

SUMMARY

In the transmission disclosed herein,, there is a manual range of operation including reverse, neutral, and first and second gears, with an automatic range of operation between second and eighth gears. The manual gear selector positions a manual control valve to provide for transmission operation in the manual range or for operation in the automatic range. The control disclosed herein will automatically up shift and down shift the transmission in the automatic range up to the gear selected by the operator and with said shifts being dependent upon the transmission output speed. As distinct from the automatic up shift and down shift, there can be a forced down shift responsive to the operator setting the manual control valve at a lower setting. The operator can move the gear selector for the manual control valve to the desired setting immediately; however, the invention disclosed herein will inhibit the actual down shift of the transmission, if necessary, in order to avoid overspeeding of the engine. For example, if the vehicle has an engine with 2200 rpm rated engine speed and the gear step ratios between third and eighth are equal (approximately 1.35), the inhibited forced down shifts will occur from an engine speed of 2200 rpm with a resulting overspeed of the engine limited to 2700 rpm. This is a 23% overspeed of the rated engine speed.

The forced down shift is inhibited in down shifting from eighth gear to third gear. The shift from third gear to second gear is not inhibited, so that such shift can occur immediately but cannot occur before the shift from fourth to third is initiated. The shift from fourth gear to second gear will not be detrimental to the engine since second gear is a purely converter range and will not significantly overspeed the converter to damage that component. Shifts into neutral, first gear and reverse will still occur immediately regardless of the previous gear setting. The reverse control position is severely gated to prevent inadvertent shifts to that position. Shifts from some of the upper gear settings into first gear, which is in the converter range, may damage the converter by overheating, but the engine will not be harmed. This ability is important in order to afford the operator with a manually operated control position that would immediately stop the vehicle in a panic situation.

A primary feature of the automatic transmission control with the down shift inhibitor system is to provide for an automatic range of operation of the transmission with up shift and down shift as determined by transmission output speed up to the highest gear manually selected and with permitted movement of the manually operable gear selector to a lower gear setting but with the forced down shift of the transmission being inhibited, if necessary, until a desired transmission output speed is reached whereby the resulting down shift will not overspeed the engine.

Another feature of the invention is to provide a down shift inhibitor system for an automatic transmission control as defined in the preceding paragraph wherein an operator may select a down shift of several gears and with the down shift through successive gears being sequential and with each down shift occurring when transmission output speed has reduced to a predetermined value.

With the system disclosed herein, the operator may immediately set the desired lower gear and the required down shifting of the transmission will occur without overspeed of the engine.

Another feature of the control and system is that a manually set down shift may result in a down shift of one or more steps which are not inhibited because of the transmission output speed, with such down shifts occurring immediately until a down shift point is reached wherein it is necessary to inhibit further down shift until the transmission output speed is reduced. In one embodiment of the transmission, the time delay between down shifts is the time required for the vehicle to slow down by the transmission step ratio factor of 35%.

An additional feature of the invention is to provide an automatic transmission control and down shift inhibitor system wherein there are a series of transmission gear ratios within an automatic range of operation and a plurality of selector valves responsive to a reference pressure and a governor pressure established by the transmission output speed provide for automatic up shift and down shift within the automatic range of operation and up to the highest gear selected by an operator and with means responsive to a setting of a manual control valve for applying a forced down shift pressure to one or more of the selector valves in opposition to said governor pressures whereby forced down shift of the transmission is controlled by governor pressures and therefore by transmission output speed in order to inhibit the down shift, if necessary, to avoid engine overspeed.

BRIEF DESCRIPTION OF THE DRAWINGS

FIG. 1 schematically illustrates a transmission drive train to which the invention is applied;

FIG. 2 schematically illustrates the automatic transmission control with down shift inhibitor system in conjunction with the hydraulic system for engaging the transmission drive train of FIG. 1;

FIG. 3 is a sectional view showing a number of components of the control and system of the present invention;

FIG. 4 is a sectional view showing additional components of the control and system of the present invention;

FIG. 5 is a fragmentary sectional view illustrating one of the components of the control in a different operational condition from that shown in FIG. 3;

FIG. 6 is a fragmentary sectional view of parts of the control and system shown in a different operational condition from that shown in FIG. 3;

FIG. 7 is an elevational view of the operator's shift console depicting the manual and automatic ranges of operation;

FIG. 8 is a graph illustrating three curves of pressures produced by a governor in response to transmission output speeds;

FIG. 9 is a view, similar to FIG. 3, showing the control and system set for operation in eighth gear;

FIG. 10 is a view similar to FIG. 9 showing the control and system wherein an automatic normal down shift to seventh gear has been completed;

FIG. 11 is a view, similar to FIG. 10, and illustrating a manually forced down shift to seventh gear as distinguished from the automatic down shift illustrated in FIG. 10;

FIG. 12 is a chart of governor pressures obtained from three governor spools showing points of automatic upshift and down shift and forced down shift points;

FIG. 15 is a graph illustrating three curves of pressures produced by a governor in response to transmission output speeds in accordance with the alternate embodiment of the invention.

DESCRIPTION OF THE EMBODIMENTS

Figure 13:
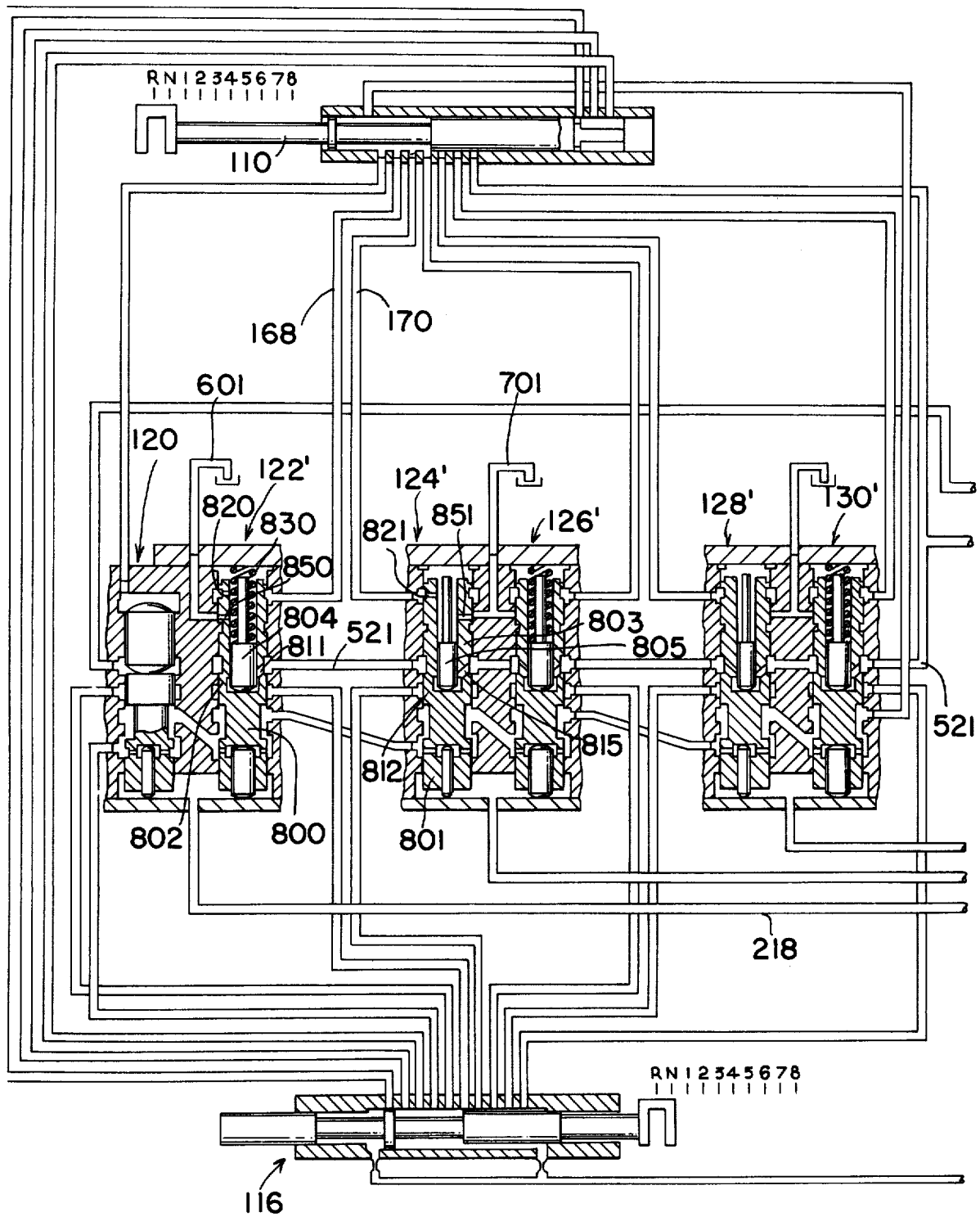
FIG. 13 is a view, to FIG. 3, of an alternate embodiment of the invention wherein the forced down shifts occur at the same governor pressures as the automatic down shift.

The transmission drive train is illustrated in FIG. 1 and is the same illustration as given in U.S. Pat. No. 3,452,621 and with the same reference numerals applied thereto as in said previous patent. An engine driven shaft 10' is suitably arranged to drive a fly wheel 11'. A gear 12' is preferably splined to the flywheel and a rotor shaft 13' which in turn drives a rotor 16'. The rotor shaft 13' is suitably arranged to drive a pair of transfer gears 20' and 21'. The gear 21' is further arranged to drive a gear shaft 22' to provide a power input to a multi-speed gear assembly by means of the schematically illustrated transfer gears. A transfer gear 46'' is arranged to provide a power input to the multi-speed assembly comprising a torque converter 10'' and a power train comprising a series of brakes and clutches arranged to be selectively actuated. The multi-speed gear assembly is suitably arranged to drive an output member or pinion gear 36'' which operatively meshes with a face gear of the vehicle's differential. The clutches and brakes may also be termed "drive establishing means".

This disclosure of U.S. Pat. No. 3,452,621 is incorporated herein by reference and reference may be made thereto for a more detailed understanding of the foregoing structure as well as to additional related prior patents of the assignee of this application, namely U.S. Pat. Nos. 3,347,113, 3,352,385, and 3,386,540, which are incorporated by reference in the first of the above-mentioned patents. The hydraulic control system utilized to selectively actuate the transmission drive train illustrated in FIG. 1 is shown in FIG. 2. FIG. 2 of this application generally corresponds to FIG. 2 of U.S. Pat. No. 3,452,621. The same reference numerals have been applied as used in U.S. Pat. No. 3,452,621. A positive displacement pump 50''' is suitably connected to the vehicle by gear means (not shown) to pump pressurized fluid from sump 51''' through a priority valve 142 and through a conduit 53'''to a branch passage having a flow restriction 54''', to a pressure control valve 66''' and to a selector control valve 55'''.

The selector control valve 55''' comprises a housing constructed and arranged to slidably mount a plurality of valve spools 57'''', 58'''', 59'''', and 60''''. The valves function to selectively communicate fluid to clutches and/or brakes A through G as identified in FIG. 1. Conduits 61''', 62''', 63''' and 64''' and drain conduit 65a''' communicate with the selector control valve.

Pressure control valve 66''' is integrated into the system and arranged to communicate with aforementioned conduits 53''' and 61'''-64'''. In addition, the pressure control valve communicates with a torque converter 10'' in the conduit 68'''', lubrication conduit 69''', drain conduits 65b''' and 65c''', and a conduit 71'''' of a hydrodynamic retarder system.

FIG. 2 also schematically illustrates a retarder control system, arranged to be supplied with fluid by converter 10'' via conduit 73''''. A retarder control valve 74'''' is arranged to be selectively actuated to communicate fluid from conduit 73'''' to a conduit 75'''' which, in turn, communicates with retarder 17'. A conduit 76'''' is arranged to selectively communicate through the retarder control valve 74'''' to a drain conduit 65d'''' or a conduit 77''''. Conduit 77'''' and a conduit 78'''' are arranged to communicate the fluid through a conventional heat exchanger 79'''' to cool the fluid passed through the torque converter and retarder.

An air control valve 80'''' is arranged to selectively activate the retarder control valve. This air control valve may be of the type disclosed in U.S. Pat. No. 3,057,666.

Referring now to FIGS. 3 and 4 in conjunction with FIGS. 1 and 2, the pump 50''' continuously supplies pressure fluids in a range from 175 to 400 psi to conduits 83 and 84. Conduit 83 supplies pressure fluid to a priority valve 142 which has a coil spring 143 for biasing a valve spool 144 to the closed position shown whenever the pressure in conduit 83 and, consequently, the pressure in a spool cavity 146 drops below 175 psi. Normally, however, the pressure in conduit 83 is at least 175 psi, thereby moving priority valve spool 142 to the right so that the fluid pressure in conduit 83 is communicated to the transmission controls by way of a conduit 312. A drain 147 is provided on the priority valve to prevent any hydraulic lock which might occur due to fluid leakage.

Conduit 84 leads to an automatic transmission control shown generally at 108 in FIG. 2. The automatic control in general serves to communicate the position of a control spool 110, as set by a manually operable gear selector, so as to remotely and automatically position a power spool 118 which, through a suitable linkage, automatically controls the selector valve spools 57'''–60'''. Automatic transmission control 108 senses load and transmission output speed through an output governor 112 which is mechanically connected to the output carrier of the power train of the transmission through a long quill shaft 114 to measure the speed of the output planetary carrier of the power train. The governor 112 provides a plurality (three in the instant application) of separate hydraulic signals which are in direct proportion to the aforementioned output speed and upon which the various shift points of the system depend. The specific details of the governor are not disclosed; however, reference may be made to U.S. Pat. No. 3,450,144 for a more complete disclosure thereof and such disclosure is incorporated herein by reference.

The manual control spool 110 is shown in FIG. 3 as movable in the housing of the control valve 111. The control spool 110 has an enlarged portion 113 which, depending upon its position, can either block off conduits 296, 298 and 300 or selectively drain them via a groove and port arrangement 164. The control valve 111 is also provided with a compartment 302 which may selectively communicate with a conduit 292 and with a group of conduits 166, 168, 170, 172, 174, and 176, which latter conduits may hereinafter be referred to as either forced downshift or hold lines. These latter lines communicate with a series of automatic selector valves which will be described in greater detail hereinafter.

The control spool 110 is also provided with a land 190 whereby as the control spool 110 moves to the right, as shown in FIG. 3, the forced down shift pressure normally present in forced down shift lines 166–176 is progressively shut off by the spool land 190 and then subsequently each of the forced down shift lines are opened to communicate with a drain 192.

A plurality of shift reference pressures are obtained by a valve structure, indicated in FIG. 4, including a down shift reducing valve 138 which is supplied with pressure from pump 50''' through line 84 and which connects with a common rail conduit 251. The down shift reducing valve functions to reduce the pressure of the fluid supplied thereto to a pressure of 96 psi in a line 278 which connects to a hold valve 408 which is normally in the open position shown whereby line 278 is connected to a line 156 leading to compartments 150 and 152 of a power control valve, indicated generally at 116. The common rail conduit 251 also supplies from pump line 84 to a shift reference valve 136 which is a conventional pressure reducing valve with a throttling slot 252 to establish reduced reference pressure from conduit 278. In this application, valve 132 meters at its throttling slot to establish a reference pressure of 38 psi in conduits 258. Valves 132, 136, and 138 establish their reduced reference pressure through the adjustment valve spool biasing springs 264'', 264' and 264, respectively. The conduit 258 is connected to a first selector valve 120 while the conduit 262 connects to a conduit 304 extending to the housing 111 for the control spool 110 and also to a line 521 which extends to the remaining selector valves indicated generally at 122, 124, 126, 128 and 130 in FIG. 3. The conduit 262 extending from the shift reference valve 136 connects with a conduit 277 (FIG. 4) leading to the output governor 112. The output governor has conduits 218, 220 and 222, which connect to a blocker valve 400 and extend therefrom to selected ones of the automatic selector valves as shown in FIG. 3. The blocker valve 400 functions in the same manner as described in U.S. Pat. No. 3,452,621 to cut off the governor conduits from the automatic selector valves during certain shift periods and is normally held in position to permit the conduits to remain open by pressure supplied through a line 402 from the transmission controls.

The rotation of shaft 114 causes three governor reducing valves (not shown) within the output governor 112 to establish three different pressure curves as shown in FIG. 8 as curves X, Y and Z, which represent the plot of governor signal pressure (psi) with respect to transmission output speed (rpms). The curve X represents the governor pressure signals supplied to line 218 while curve Y is the governor pressure signal supplied to line 220 and curve Z represents the governor pressure signals supplied to line 222. It will be noted that the maximum governor pressure signal for all three governors is 159 psi in the pressure values selected for the system disclosed herein. This pressure signal is the output for curve Y until the transmission output speed drops to approximately 1200 rpms and for curve X until transmission output speed drops to approximately 700 rpms. The governor pressure signals are delivered to the automatic selector valves as an indication of transmission output speed.

The power control valve 116 includes a power spool 118 having a land 154 separating compartments 150 and 152. The diameter of spool land 154 is larger than the diameter at the ends of the spool in order to provide a differential area so that if the pressures in compartments 150 and 152 are different, the power spool 118 will move. Flow-limiting orifices, 160 and 161, are provided to control and limit fluid flow into compartments 150 and 152. Conduits 296, 298 and 300, previously referred to as connecting into the manual control valve 110, extend to the power control valve 116. Conduits 280, 310, 312, 314, 316, 318, and 320 extend from the power control valve 116 and to various ones of the selector valves 120–130 with the position of the power spool 118 being obtained by a balance of pressure in the compartments 150 and 152 and dependent upon draining of one of the aforesaid conduits leading to a selector valve or one of the conduits 296, 298 and 300 leading to the manual control valve. Covering of a conduit is obtained by the land 154 of the power spool 118.

The foregoing structure described in FIGS. 1–4 is substantially the same as the structure shown in FIGS. 1–4 of U.S. Pat. No. the control except that the forced down shift pressure signals are not obtained directly from the pressure source, namely, pump 50''', but are obtained from the shift reference valve 136 which provides a pressure for causing forced down shift which is equal to the maximum governor pressure signal, as shown in FIG. 8. This particular down shift pressure signal is applied to selector pressure control valves 122–130; however, as in the previous patent, the shift reference valve 132 provides a pressure of 38 psi to the selector valve 120. There is one less shift reference valve in the control of this application than in the previous patent and, in place thereof, an accumulator 500 (FIG. 4) is connected by a line 500a to the conduit 218 leading from the output governor to provide a more stabilized governor pressure signal represented by curve X in FIG. 8, since such curve has a relatively steep slope and the accumulator effectively stabilizes pressures between 20 and 90 psi. The supply of the output governor 112 has been shifted to be supplied through line 277 whereby a higher maximum governor pressure signal is obtained than in the control of the previous patent. The priority valve 142 is maintained at a minimum pressure setting of 175 psi because of the higher governor feed pressure of 159 psi through line 277. A primary distinction of the structure disclosed in this application over the previous control is in the supply of 159 psi fluid through conduit 262 to the selector valves through the line 521 and also to the manual control valve through line 304 to provide the forced down shift pressure signal dependent upon the position of the control spool 110.

In the description of the control and system, certain pressure values have been and will be assigned to various portions thereof and it should be understood that these relative values are for illustrative purposes and that other similarly-related values could be used and be within the scope of the invention.

The description of the structure given above is of a structure generally similar to that shown in U.S. Pat. No. 3,452,621 except for a different pressure connection for conduit 304, the use of one less shift reference valve, and the utilization of an accumulator 500. Also, the selector valves 122–130 are of a different construction, which is to be described. Even though a number of the selector valves are of a different construction than the previous patent, the over-all operation except for inhibiting down shifts is the same as in said previous patent.

The selector valves 120–130 control the shifts between certain gears and, specifically, 2–3, 3–4, 4–5, 5–6, 6–7, and 7–8, in either an up shift or down shift relation with the reference 2–3 referring to a shift from second gear to third gear.

The selector valve 120 is of the same construction as in U.S. Pat. No. 3,452,621, wherein a first valve member 194, in the form of a spool, is movable within a bore of the valve body and coacts with a second valve member in the form of a holding slug 178 movable in the upper part of the bore, as shown. As described in U.S. Pat. No. 3,452,621, the holding slug 178 is subjected to a reference pressure supplied to the underside thereof through line 258 and selectively to a down shift pressure delivered through line 166 from the control valve 111. The pressure through line 258 is also directed to the top of the first valve member 194 and acts in opposition to the governor pressure signal supplied through line 218 and which is of a value indicated by curve X in FIG. 8, dependent upon transmission output speed. The position of the first valve member 194 controls lines 280 and 310 leading from the power control valve 116. With the valve member downshifted, as shown in FIG. 3, line 310 is blocked while line 280 is in communication with passage 550 which, with the various selector valves positioned as shown in FIG. 3, communicates with similar passages 551 and 552 in other of the selector valve housings and with these being interconnected by passages 553 and 554, whereby line 280 is connected to drain through line 292 leading to the control valve 111.

The selector valves 122–130 are of the same construction, with selector valves 122, 126 and 130 being identical in all respects and with selector valves 124 and 128 being identical, but having a second valve member of a lesser area than selector valves 122, 126 and 130 subjected to forced down shift pressure. The selector valve 122 has a first valve member 560 with a cavity 561 open to the upper end thereof and with a passage 562 through the wall of the valve member connecting the cavity with the line 521 extending in unblocked relation through all the selector valves and supplying a reference pressure from the reference valve 136 to the upper side of the first valve member 560 of selector valve 122 and the first valve members 565, 566, 567 and 568 of the selector valves 124–130, respectively. Each of the first valve members of selector valves 122–130 receives a movable reference pressure slug 570, 571, 572, 573 and 574 in the cavity thereof engaging between the lower wall of the cavity of the first valve member and a second valve member having two parts including a transfer piston 580 and a down shift slug 581. Each of the selector valves 124–130 has a corresponding transfer piston, 582, 583, 584 and 585, and down shift slugs 590, 591, 592 and 593. It will be noted that down shift slugs 590 and 592 are of the same diameter and of a diameter less than the down shift slugs 581, 591 and 593.

Each of the transfer pistons 580, 582, 583, 584 and 585 has a passage 600 extending therethrough from end to end and a pair of connecting lateral ports opening to the periphery thereof. The transfer piston 580, in the position shown in FIG. 3, communicates the surrounding space to tank through a line 601. A spring 605 is positioned within a bore of each of the downshift slugs to act between the slug and the transfer piston and normally urge these two components apart as shown in FIG. 3.

Each of the hold lines 168, 170, 172, 174 and 176 extends to the respective selector valves 122–130 and has two connections to each of the selector valves with one branch connection being to the top of the selector valve and above the down shift slug of the selector valve and the other branch being into a bore of the valve in the area of the transfer piston.

All of the selector valves, 120–130, are shown with their valve members in downshifted position in FIG. 3, wherein the manual control spool 110 is shown in position for operation of the transmission in reverse. In this position of the selector valves, fluid pressure is communicated from conduit 280 through the passages 550, 551, 552, 553 and 554 to the conduit 292 leading to the manual valve.

The selector valves are mounted in housings in pairs whereby selector valves 120 and 122 are subjected to a governor pressure signal through line 218 and as represented by curve X in FIG. 8. The housing for selector valves 124 and 126 is connected to conduit 220 in order to have the valve members subjected to a governor pressure signal of a value represented by curve Y in FIG. 8. Selector valves 128 and 130 are paired in a housing subjected to a governor pressure signal through line 222 and having a value represented by curve Z in FIG. 8. FIG. 8 has three codes associated with the curves indicating the up shift and down shift points on the curve whereby automatic shifts may occur dependent upon transmission output speed. An additional code indicates governor pressure signals of a value below which a manually demanded forced down shift of the transmission may occur. For example, if the vehicle is travelling in eighth gear and the transmission output speed is 2200 rpms, the operator may move the manual control valve spool 110 to position 3 on the manual console shown in FIG. 7.

Referring first to curve Z, it will be noted that the transmission output speed must reduce to a value of approximately 2010 rpms before a down shift to seventh gear may occur. Further referring to curve Z, the transmission output speed must further reduce to approximately 1490 rpms for down shift to the 6th gear. During this interval, the governor pressure signals represented by curves X and Y have stayed at the maximum value. As transmission speed reduces to approximately 1100 rpms, then, as shown on curve Y, down shift can occur from sixth gear to fifth gear and shift to fourth gear can occur at a transmission output speed of approximately 810 rpms.

The actual values are stated in the chart of FIG. 12, referred to hereinafter.

In normal automatic up shift and down shift operation, which is a range of operation between second gear and eighth gear in the transmission disclosed herein, a particular governor pressure signal representative of a transmission output speed is applied to one end of a first valve member of the selector valves with a shift reference pressure from conduit 521 applied to the cavity 561 at the upper ends of the first valve members. This is a reference pressure of 159 psi which has its high value compensated for by the slugs 570–574 in order to give the same normal automatic up shift point. For example, selector valve 130 will up shift from seventh gear to eighth gear at a transmission output speed of approximately 1640 rpms, as shown in curve Z in FIG. 8, which is a governor pressure signal of 81 psi. This indicates a relative area relation between the opposite areas of the first valve member 568 of this selector valve whereby a pressure signal of 81 psi will force the valve member upwardly against the reference pressure of 159 psi.

The values of governor pressure signals as related to transmission output speed and engine rpm are shown in FIG. 12, which is a chart of the curves shown in FIG. 8. As indicated, the upper section of the chart shows the normal automatic shift points and the lower section of the chart shows the points wherein forced down shift can occur in response to manual movement of the gear selector and manual control valve 111. The forced down shift points from 8–7, and 7–6 are controlled by governor pressure signals represented by curve Z. The forced down shift points from 6–5 and 5–4 are controlled by governor pressure signals represented by curve Y, while the forced down shift point from 4–3 is represented by a governor pressure signal on curve X.

Another factor in the selection of 159 psi which supplies the governor as well as defining the reference pressure is that the governor-reducing valves of the output governor must regulate to a point above that corresponding to the maximum forced down shift point which is 122 psi in fourth, sixth and eighth gears. The actual value of 159 psi was selected by the maximum size slugs 570, 572 and 574 that could be used in three of the selector valves.

The conduit 262 supplies the shift reference pressure to the selector valves except for selector valve 120, and also through line 304 provides the same pressure to the manual control valve 111 providing the pressure for forced down shift operation in response to movement of the manual control valve. Thus, a controlled forced down shift pressure signal may be supplied to the selector valves for the controlled force relation with respect to the governor pressure signal supplied to the selector valves.

In order to achieve a follow-through shift, it is necessary to positively insure that a shift is made from a lower to a higher horsepower condition. This dictates that a spread is needed between the up shifts and the down shifts in the automatic range as shown in the graph of FIG. 8. This is accomplished by use of a series of smaller slugs, 650, 651, 652, 653, 654, and 655 which are each movably received within a cavity within the first valve member of the selector valves 120–130. Up shifts are made by comparing reference pressure supplied by conduit 521 directly with a governor pressure signal delivered to the selector valve. To achieve a lower required governor pressure signal for down shifting, a third pressure (96 psi) is introduced into cavities receiving the slugs 650–655. This pressure is supplied from the power valve 116 through the line 280 and is present within the cavity housing the lower slug only when the first valve member of the selector valve is in its upper position in order to block flow through passages 550, 551 and 552 downstream of the particular selector valve which is in up position and which is to be down shifted. This third pressure is higher than governor pressures and less than the shift reference pressure at the various down shift points and is present in only those cavities of the first valve members which are in their upper positions.

The foregoing spread between up shifts and down shifts means that while the up shift between any two gears in the automatic range occurs at one specific rpm value, down shift occurs at a considerably lower rpm value to prevent excessive valve shifting or hunting. Whenever an up shift or down shift occurs, the load forces in each selector valve bore must balance before an automatic speed change is made.

The shift console shown in FIG. 7 shows that the reverse, neutral, and first through eighth gears and resulting speeds may be manually selected by the operator. The reverse, neutral and first two gears are in a manual range of operation and are a set operation despite speed and load changes. This can be permitted because the torque converter provides a broad operating range in the lower gears. If the gear shift lever is placed in any one of third through eighth gear settings, the automatic range of operation occurs wherein the gear shift lever and the resultingly positioned manual control spool 110 serves as the upper limit of transmission operation. In this automatic range of operation, ground speed acts to shift the transmission up to the gear limit placed by setting of the gear shift lever or down to second gear. It is to be understood that it is within the scope of the invention to alter the gears comprising the manual and automatic ranges of operation to suit the operating characteristics of the particular vehicle upon which the automatic transmission control and down shift inhibitor system is to be applied.

The reverse, neutral and first gear control of the transmission are as described in U.S. Pat. No. 3,452,621 and the description thereof is again incorporated herein by reference. Basically, the control valve 111 may connect one of the conduits 296, 298 or 300 to drain with a resulting balancing of the power control valve 116 in a corresponding position for appropriate setting of the transmission. The shift reference pressure applied through conduit 521 to the upper side of the first valve members of selector valves 122-130 assures that these valves will not be shifted upwardly from the position shown in FIG. 3 due to any governor pressure signal, particularly when it is understood that transmission output speed in reverse and first gear is at a relatively low rpm and a relatively low governor pressure signal is outputted from the output governor 112. Additionally, pressure through conduit 292 to the hold line 166 assures that the selector valve 120 is maintained in the position shown in FIG. 3.

The operation in second gear is the same operation as in U.S. Pat. No. 3,452,621 wherein the selector valve 120 is of the same construction as shown in the previous patent. The manual control spool 110 is moved to a position to connect conduit 292 to drain whereby conduit 280 is connected to drain by its communication through the selector valves whereby the power control valve 116 moves to a new balanced condition to shift the transmission to second gear. This position of the manual control spool 110 has placed the hold lines 166, 168, 170, 172, 174 and 176 in communication with the forced down shift pressure signal from conduit 304 whereby the selector valves are held in their down shifted position.

If the operator selects third gear, the hold line 166 is connected to drain to remove down shift pressure from approximately from the second valve member slug 178, whereby the 38 psi delivered to the upper side of the first valve member 194 by line 258 acts in opposition to a governor pressure signal through line 218. As shown by the graph of FIG. 8 and the chart of FIG. 12, an up shift will occur if or when the governor pressure signal is approximately 41 psi. This, then, places line 310 connected to the power valve 116 to drain, with the result that the latter valve shifts to again establish a balanced condition. During movement of the power valve spool, pressure is delivered to conduit 280 from the left-hand side of the land 154 of the spool which enters the cavity housing the downshift slug 650 to exert upward force on the first valve member and create a "snap action." During shift, any drop in pressure resulting from the clutch operation of the transmission is sensed by the priority valve 142 to close the valve and assure maintenance of pressure in line 84 which supplies the common rail 251 for reference pressure valves 138 and 136; and valve 138 in turn supplies line 278 which supplies valve 132 to maintain their respective pressures. This also acts on the blocker valve 400 to move this valve to the position shown and block any transient fluctuation signals from the output governor 112.

Refer to FIGS. 5 and 6 in the event the operator selects fourth gear in moving the manual control spool 110 from a position to the left thereof, such as second, both of the hold lines 166 and 168 extended to selector valves 120 and 122 will be connected to drain. The action in going from second to third will be just as previously described. With respect to selector valve 122 in shifting 3 – 4, the forced down shift pressure signal will be released by communicating the space above the first valve member and below the transfer piston 580 to drain through the internal passage 600 in the transfer piston and the lateral port. As a result, the first valve member 560 has a reference pressure through line 521 acting on the lower wall of the cavity 561 thereof and a governor pressure signal acting oppositely against the opposite end of the valve member. Because of the different area relations, the lower end of the valve member including the downshift slug 651, a governor pressure signal of 81 psi will shift the first valve member 560 upwardly to thereby place line 312 leading from the power valve 116 to drain through line 553 and subsequent selector valves whereby the power control valve may move to a new balanced position with resulting setting of the transmission in fourth gear. This upshift action is facilitated by pressure from line 550 acting within the cavity holding the down shift slug 651.

Automatic shifts occur up to the setting of the manual control spool 110 releasing down shift pressure from hold lines of selector valves whereby governor pressure signals may act in opposition to the reference pressure signal on the first valve member of a particular selector valve. When the requested up shift is through a series of gears, the range of governor pressure signals provided by the output governor to the conduits 218, 220, and 222 are arranged as shown in the graph of FIG. 8 to arrange for sequential up shift through each gear. Sequencing is obtained by differing the size of the cavities 561 in the first valve members 565 and 566 of the selector valves 124 and 126 which are paired in the same housing and the first valve members 567 and 568 of selector valves 128 and 130 which are paired in a second housing. The same governor pressure signal is delivered to a housing and in order to assure sequential upshifting, the reference pressure from the line 521 is applied against a smaller area within the cavity 561 housing the reference pressure slug 571 than the cavity housing the reference pressure slug 572. Thus, there is a smaller total force opposing the force applied by the governor pressure signal in selector valve 124 whereby this valve will upshift from the position shown in FIG. 3 prior to upshift of selector valve 126. This same relation is established for selector valves 128 and 130 whereby selector valve 128 will up shift prior to selector valve 130. The position of the selector valves when all are in upshifted position is shown in FIG. 9 wherein the transfer pistons 580, 582-585 of the selector valves are positioned against the associated down shift slug. Each transfer piston has blocked the hold line leading to the selector valve from the manual control spool from communication with the interior of the selector valve and with the interior surrounding the transfer piston being connected to drain. This is the drain line 601, previously referred to with respect to the selector valve 122. There is a common drain line 700 for selector valves 124 and 126 and a common drain line 701 for the selector valves 128 and 130.

In an automatic downshift, the transmission output speed may drop to give a governor pressure signal of a value indicating the desirability of a lower gear position. There is a spread between automatic up shift and down shift positions, as shown in the graph of FIG. 8, which results from pressure in the cavities of the valve member housing the down shift slugs which exists when the selector valves are in their upshifted positions. When the force exerted upwardly against a selector valve member by a governor pressure signal and the pressure acting within the cavity housing the down shift slug is overcome by the reference pressure acting within an upper cavity 561 of the first valve member, a down shift will occur.

Assuming that the manual control spool 110 has been set for eighth gear, as shown in FIG. 9, and the transmission is operating in eighth gear as determined by the setting of the spool 118 of the power valve 116, all of the selector valves 120–130 are in their upper up shifted position. An automatic down shift is illustrated as completed in FIG. 10. In comparing FIG. 10 to FIG. 9, it will be noted that the manual control spool 110 is still in the same position as preset by an operator; however, the spool 118 of the power valve 116 has shifted to place the transmission gearing in seventh gear. The action that has occurred is primarily the down shift of the first valve member 568 of the selector valve 130. This down shift results from the reference pressure in line 521 acting in the cavity 561 at the upper end of the valve 568 through the passage 562 overcoming the 96 psi pressure derived from line 156 through the power valve 116 extending to line 318 and acting within the lower cavity housing the downshift slug 655 as well as overcoming the governor pressure signal which, on curve Z, has reached a value of 72 psi and which acts on the lower end of the valve member surrounding the down shift slug 655.

The downward shift of the first valve member 568 of selector valve 130 opens conduit 318 to line 292 through the bore of selector valve 128. With line 292 connected to drain, there is an imbalance in the power control valve 116 with the result that the latter valve moves to a new balanced condition, shown in FIG. 10. As there are further decreases in transmission output speed, the selector valves would operate sequentially, commencing with selector valve 128 and then selector valve 126, etc., to progressively shift the power valve 116 and down shift the transmission. As pointed out previously, the difference in area of cavity subjected to the reference pressure line 521 assures that selector valves 128 and 124 operate after their respective paired selector valves 130 and 126.

In such automatic up shifts and down shifts, the second valve member including the transfer pistons and holding slugs of the selector valves are inactive in the system.

When a forced down shift is attempted, the operator is permitted to move the manual control spool 110 to a desired downshifted position. As shown in FIG. 11, an operator has moved the control spool 110 from the eighth gear position of FIG. 9 to the seventh gear position. FIG. 11 illustrates a forced down shift from eighth gear to seventh gear, while FIG. 10 illustrates an automatic down shift from eighth gear to seventh gear. In the condition illustrated in FIG. 11, all of the selector valves except for selector valve 130 are in the upshifted condition. And, also, the selector valve 130 will be in the upshifted position prior to movement of the manual control spool 110. When the latter spool is shifted to the position shown in FIG. 11, reference pressure of 159 psi is delivered from line 304 to hold line 176, which delivers the forced down shift pressure to the top of the holding slug 593 of the second valve member of selector valve 130. It is also delivered to the space surrounding the transfer piston 585. However, this branch of the hold line 176 is blocked by the position of the transfer piston. The forced down shift pressure thus directs force urging the holding slug 593 downwardly to also urge the transfer piston 585 downwardly, which is in engagement with the slug, and the transfer piston acts against the reference pressure slug 574 to direct force to the first valve member 568. If, and when, the total force acting downwardly on the holding slug 593 exceeds the force resulting from application of the governor pressure signal to the underside of the first valve member 568 as well as the force resulting from pressure acting within the cavity housing the down shift slug 655, the line 318 from the power valve 116 will be opened to tank and the spool 118 of the power valve may seek the position shown in FIG. 11 for setting the transmission in seventh gear. The foregoing operation only may occur in response to a predetermined transmission output speed. When the inhibited downshift has been completed, the spring 605 acts to separate the transfer piston 585 from the down shift slug 593, as shown in FIG. 11, because down shift pressure is then delivered through the branch of hold line 176 to the interior of the transfer piston and directed to opposite ends thereof through the passage 600 in the transfer piston. This eliminates the possibility of the transfer piston 585 opening up the drain port again. The spring 605 also prevents the possibility of an up shift occurring if the governor pressure in conduit 222 equals the reference pressure in the first valve member cavity communicating with the reference pressure line 521 after a forced down shift.

In the event an operator moves the manual control spool 110 from the eighth gear setting of FIG. 9 to a gear setting lower than gear seven, such as gear four, then a forced down shift pressure signal will be delivered to hold lines 170, 172, 174 and 176 and selector valves 130, 138, 126, and 124 will down shift as permitted by progressively decreasing governor pressure signals as indicated by the curves in the chart of FIG. 8 and with the relation of governor pressure signals and sizes of components of the selector valves assuring that the downshifts occur in sequence.

It should be noted that when forced down shift pressure is not applied to the selector valves, the second valve members thereof including the down shift slugs and transfer pistons are in an upper position against the cover of the housings for the selector valves and the slugs and transfer pistons are in contact wth each other because of the reference pressure acting within the cavity of the first valve member and against the slugs 570–574 positioned therein.

A foot operated air valve 750 is connected to the spool of hold valve 408 whereby operation of the air valve will shift the spool and block flow to line 156 to halt all manual ad automatic operation.

With the automatic transmission control and down shift inhibitor system disclosed herein, there are no restrictions placed upon the gearshift lever movement and the positioning of the manual control spool 110 in demanding a down shift of the transmission. The actual down shift is inhibited and dependent upon transmission output speed to prevent excessive engine overspeed. The down shift may occur as the transmission output speed decreases. This inhibition of down shift, as forced by an operator, does not affect normal automatic shifting characteristics including automatic up shifts and down shifts with the latter as well as inhibition of forced down shifts being controlled by governor pressure signals. The system is designed whereby forced down shifts will not occur if the engine will overspeed its non-dog-legged rated speed by 25%. Additionally, the manual control spool 110 controls the top gear setting of the transmission and up shifts will not be made into ranges beyond that selected by positioning of the manual control valve. If the console lever is downshifted to neutral, and then shifted to an inhibited range, the transmission will shift to neutral and then back to the lowest uninhibited range no higher than the original setting.

Additionally, if the gearshift lever and the manual control spool 110 are positioned to either up shift or down shift the transmission into an inhibited range, the transmission will downshift to the lowest uninhibited range and then inhibited down shifts occur in single gear steps and the time delay between shifts of the gears is the time required for the vehicle to slow down by the transmission-step ratio factor. This is a factor of 35%. Shifts into second are inhibited by the requirement that they can only occur from third gear; however, it is not governed by a particular output speed of the transmission.

Figure 14:
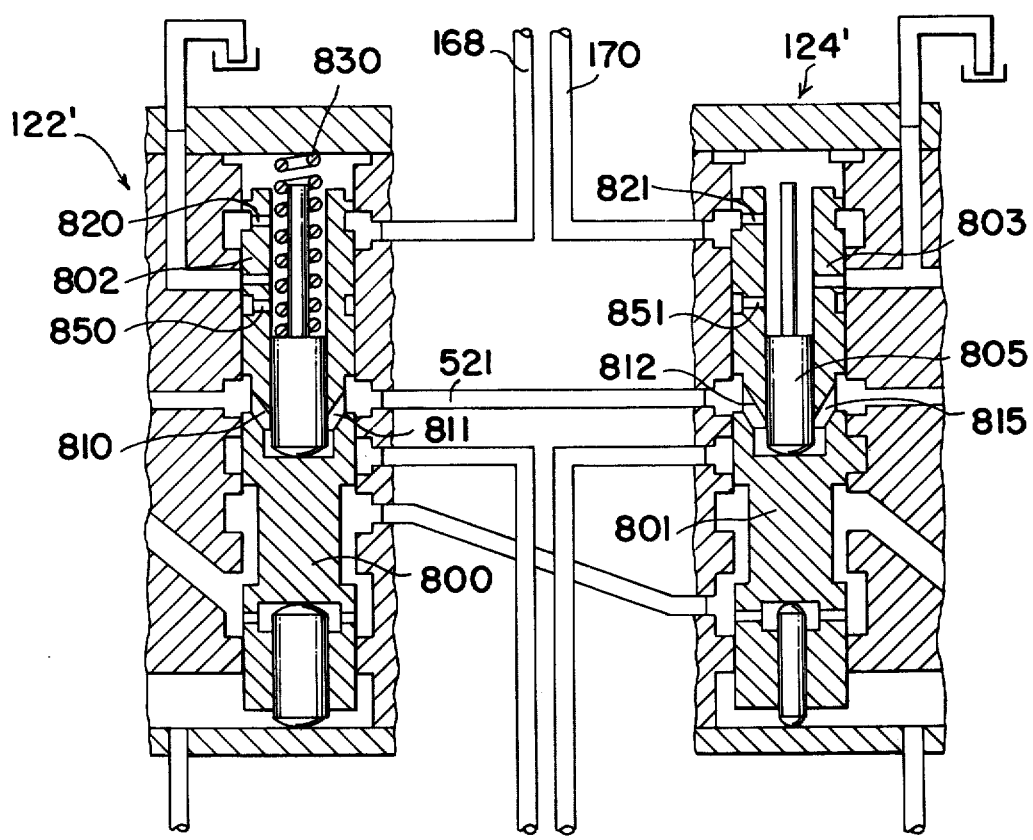
FIG. 14 is an enlarged sectional view of a pair of the selector valves shown in FIG. 13.

An alternate embodiment of the invention is shown in FIGS. 13 and 14 and a graph of governor pressure curves for this embodiment is shown in FIG. 15 in a manner corresponding to the graph of FIG. 8 of the first embodiment. The primary distinction in this embodiment over the first embodiment is that the forced down shifts under operation of the gear selector of the operator's console may occur only at the same transmission output speeds as normal automatic downshifts. In this embodiment, the selector valve 120 is the same as in the first embodiment as are the manual control spool 110 and the power valve 116 and with all the conduit connections to these components as well as the selector valves. The selector valves, other than selector valve 120, are modified from the forms of the first embodiment and these selector valves have been given the same reference numeral with a prime affixed thereto. The construction of the selector valve 122' which controls the 3–4 shift is identical to selector valves 126' and 130' which control the 5–6 and 7–8 shifts, respectively. The construction and operation of selector valve 124' which controls the 4–5 shift is identical to selector valve 128' which controls the 6–7 shift. The normal up shifts and down shifts in the automatic range continue to be determined by reference pressures from the shift reference valves 132 and 136 and the governor pressure signals.

The valve members 800 and 801 for the selector valves 122' and 124', respectively, have lower parts similar to the corresponding first valve members 560 and 565 of the first embodiment; however, the upper ends thereof have been modified to provide a sleeve portion 802 and 803, respectively, which extends upwardly from the cavities housing the holding slugs 804 and 805. Reference pressure from line 521 is applied to the cavities within the interior of the valve members by ports 811, and 815 to act downwardly on the valve members and upwardly against the holding slugs 804 and 805. With the valve members 800 and 801 in the down shift condition, shown in FIGS. 13 and 14, forced down shift signals through hold lines 168 and 170 are routed to the exposed upper area of the valve members and through the single connection of the hold lines 168 and 170 to the selector valves through a pair of orifices 820 and 821 in the wall of the sleeve of each of the valve members. A spring 830 is added behind the holding slug 804 to provide an extra force to hold the valve member 800 in the downshifted position when the forced down shift pressure signal is delivered through the hold line 168. This is required, since the down shift pressure signal, the reference pressure in conduit 521 in the cavity of the valve member as well as the governor feed pressure are all supplied with pressure from reducing valve 136 and in an extreme overspeed condition in third gear the governor signal through line 218, as represented by curve X, could equal the forced down shift pressure signal; therefore, spring 830 will hold the valve member 800 in the downshifted position. The structure and operation of selector valve 126' and 130' is the same as selector valve 122', just described. No spring is required behind the slug 805 of selector valve 124', since the overspeed condition in fourth gear would be so extreme before the governor pressure signal, as shown in curve Y, could equal the downshift pressure signal that the engine would have already been severely damaged. The same holds true for selector valve 128'. Selector valve 128' has the same structure and operation as selector valve 124'.

The spring 830 does not affect the normal shift points since, when the forced down shift pressure signal is not applied, the reference pressure in line 521 compresses the spring 830 when the pressure seats the slug 804 against the cover of the selector valve housing and, therefore, only reference pressure in line 521 is applied to the valve member 800. When the valve members of the selector valves are in the upshifted position, a forced down shift pressure signal delivered to a selector valve through the associated hold line is blocked by the sleeve part of the valve member, such as the sleeve 802 of the valve member 800. In the upshifted position, the orifices 820 and 821 of the selector valves have moved upwardly beyond communication with the respective hold line. The full area of valve 800 above slug 804 is drained of leakage flow from hold signal 168, by orifices 850 and 851 when a valve member is in an upshifted position, since the orifices 850 and 851 are in communication with drain lines 601 and 701, respectively, whereby downshifts as forced by operator demand can only occur at normal downshift points.

In this embodiment, the valve member of each selector valve, except selector valve 120, has an up shift position to block application of the forced down shift pressure signal thereto. Therefore, the governor pressure signal acting on a particular selector valve acts to hold the valve member in the upshifted position until the governor pressure signal reaches the level wherein an automatic down shift may occur.

I claim:

1. A hydraulic control system for a multispeed transmission having drive components associated to produce a preselected group of gear ratios in an automatic range of operation, said control system comprising: a manual control valve; a group of automatic selector valves; a power control valve; fluid conduit connections interconnecting said manual control valve with both said group of automatic selector valves and said power control valve; said power control valve connected to gear ratio control means for producing a selected gear ratio in the automatic range; governor means for simultaneously establishing plural governor pressures dependent upon transmission output speed, means for applying each of the governor pressures to a different one of the automatic selector valves, means for applying a reference pressure to each of the last-mentioned selector valves in opposition to the governor pressure, means including the selector valves responsive to variations in transmission output speed and governor pressure to automatically up shift and down shift the transmission within the automatic range of operation and up to the highest gear selected by positioning of said manual control valve; and means for inhibiting a forced down shift of said transmission as demanded by positioning of the manual control valve at a lower gear setting until a predetermined transmission output speed is reached, including a first valve member of a selector valve subjected at opposite ends thereof to said reference pressure and said governor pressure, respectively, and additional parts of a selector valve adjacent the first valve member which are inactive in said automatic up shift and down shift operation and having a first selected area against which a forced down shift pressure is applied by movement of the manual control valve to urge the first valve member in a direction opposed by said governor pressure and a larger second area which is subjected to the forced down shift pressure only after a forced down shift of the first valve member to hold the particular selector valve in downshifted position.

2. A hydraulic control system for a multispeed transmission having drive components associated to produce a preselected group of gear ratios in an automatic range of operation, said control system comprising: a manual control valve; a group of automatic selector valves; a power control valve; fluid conduit connections interconnecting said manual control valve with both said group of automatic selector valves and said power control valve; said power control valve connected to gear ratio control means for producing a selected gear ratio in the automatic range; means including the selector valves responsive to variations in transmission output speed to automatically up shift and down shift the transmission within the automatic range of operation and up to the highest gear selected by positioning of said manual control valve; governor means for simultaneously establishing plural governor pressures dependent upon transmission output speed; means for applying each of the governor pressures to a different one of the automatic selector valves; means for applying a reference pressure to each of the last-mentioned selector valves in opposition to the governor pressure to obtain said automatic up shift and down shift operation; each of the selector valves having a first valve member subject at opposite ends thereof to said opposing reference pressure and governor pressure for said automatic up shift and down shift operation and having a second valve member adjacent the first valve member and which is inactive in said automatic up shift and down shift operations and having a selected area and a larger area with said larger area selectively acted upon by the forced down shift pressure signal to hold the selector valve in a down shift position after a forced down shift has been effected; means responsive to movement of the manual control valve for selectively applying a forced down shift pressure to said selected area of one or more of the selector valves in opposition to the governor pressure whereby forced down shift occurs when the force resulting from down shift pressure exceeds an opposing force including a force from governor pressure; and means responsive to the value of governor pressure for preventing application of the forced down shift pressure signal to said larger area of the second valve member as demanded by positioning of the manual control valve until a predetermined transmission output speed is reached whereby down shift of the transmission is inhibited.

* * * * *